US010790566B2

United States Patent
(12) United States Patent
Gumann et al.

(10) Patent No.: US 10,790,566 B2
(45) Date of Patent: Sep. 29, 2020

(54) ENABLING ATTENUATORS FOR QUANTUM MICROWAVE CIRCUITS IN CRYOGENIC TEMPERATURE RANGE

(71) Applicant: International Business Machines Corporation, Armonk, NY (US)

(72) Inventors: Patryk Gumann, Tarrytown, NY (US); Salvatore Bernardo Olivadese, Stamford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/178,338

(22) Filed: Nov. 1, 2018

(65) Prior Publication Data

US 2020/0144690 A1 May 7, 2020

(51) Int. Cl.

| | |
|---|---|
| ***H01P 1/22*** | (2006.01) |
| ***H01P 1/23*** | (2006.01) |
| ***H01P 11/00*** | (2006.01) |
| ***G06N 10/00*** | (2019.01) |
| *H01F 7/02* | (2006.01) |

(52) U.S. Cl.

CPC ............... *H01P 1/23* (2013.01); *G06N 10/00* (2019.01); *H01P 1/227* (2013.01); *H01P 11/00* (2013.01); *H01F 7/0294* (2013.01)

(58) Field of Classification Search

CPC .. H01P 1/22; H01P 1/222; H01P 1/227; H01P 1/23; H01P 1/30

USPC ........................... 333/81 A, 81 R, 81 B, 99 S

See application file for complete search history.

(56) References Cited

U.S. PATENT DOCUMENTS

| | | | | |
|---|---|---|---|---|
| 3,663,902 | A * | 5/1972 | Deutscher | H01P 1/203 333/99 S |
| 4,876,239 | A | 10/1989 | Cachier | |
| 5,011,818 | A | 4/1991 | Katoka et al. | |
| 5,030,614 | A | 7/1991 | Hollander et al. | |

FOREIGN PATENT DOCUMENTS

| | | | |
|---|---|---|---|
| CN | 1195919 | A | 4/1997 |

OTHER PUBLICATIONS

K Ilin et al., Ultra-thin TaN Films for Superconducting Nanowire Single-Phonton Detectors, Jul. 15, 2011.

(Continued)

*Primary Examiner* — Stephen E. Jones

(74) *Attorney, Agent, or Firm* — Garg Law Firm, PLLC; Rakesh Garg; Keivan Razavi

(57) ABSTRACT

In an embodiment, a microwave circuit (circuit) includes an attenuator configured to attenuate a plurality of frequencies in a microwave signal. In an embodiment, the attenuator comprises a component of a first material, the first material exhibiting superconductivity in a cryogenic temperature range. In an embodiment, the circuit includes a magnet configured to generate a magnetic field at the attenuator, wherein the magnetic field is at least equal to a critical magnetic field strength of the first material. In an embodiment, the critical magnetic field strength causes the first material to become non-superconductive in the cryogenic temperature range.

20 Claims, 8 Drawing Sheets

(56) References Cited

OTHER PUBLICATIONS

Alexander Nie et al., Determination of the critical field and critical temperature for various Type I and Type II metals and alloys, Feb. 28, 2016.
W. Gough, The transmission of a low-frequency magnetic field into a metal, May 13, 1998.
Michelle Starr, This Superconducting Magnet Has Shattered the Record for World's Strongest, Dec. 15, 2017.
Peter Schmiiser, Superconductivity, 1996.
D. Gertenberg et al., Superconducting Thin Films of Niobium, Tantalum, Tantalum Nitride, Tantalum Carbide, and Niobium Nitride, Aug. 1964.
W.A.B. Evans et al., The critical magnetic field of a superconductor, Oct. 25, 1963.

* cited by examiner

ENABLING ATTENUATORS FOR QUANTUM MICROWAVE CIRCUITS IN CRYOGENIC TEMPERATURE RANGE

TECHNICAL FIELD

The present invention relates generally to a device, a fabrication method, and fabrication system for a microwave frequency attenuator usable with superconducting qubits in quantum computing. More particularly, the present invention relates to a device, method, and system for enabling attenuators for quantum microwave circuits in cryogenic temperature range.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

A superconducting qubit includes a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a qubit, the Josephson junction—which functions as a dispersive nonlinear inductor—is electrically coupled in parallel with one or more capacitive devices forming a nonlinear microwave oscillator. The oscillator has a resonance/transition frequency determined by the value of the inductance and the capacitance in the qubit circuit. Any reference to the term "qubit" is a reference to a superconducting qubit circuitry that employs a Josephson junction, unless expressly distinguished where used.

The information processed by qubits is carried or transmitted in the form of microwave signals/photons in the range of microwave frequencies. The microwave signals are captured, processed, and analyzed to decipher the quantum information encoded therein. A readout circuit is a circuit coupled with the qubit to capture, read, and measure the quantum state of the qubit. An output of the readout circuit is information usable by a q-processor to perform computations.

A superconducting qubit has two quantum states—|0> and |1>. These two states may be two energy states of atoms, for example, the ground (|g>) and first excited state (|e>) of a superconducting artificial atom (superconducting qubit). Other examples include spin-up and spin-down of the nuclear or electronic spins, two positions of a crystalline defect, and two states of a quantum dot. Since the system is of a quantum nature, any combination of the two states are allowed and valid.

For quantum computing using qubits to be reliable, quantum circuits, e.g., the qubits themselves, the readout circuitry associated with the qubits, and other parts of the quantum processor, must not alter the energy states of the qubit, such as by injecting or dissipating energy, in any significant manner or influence the relative phase between the |0> and |1> states of the qubit. This operational constraint on any circuit that operates with quantum information necessitates special considerations in fabricating semiconductor and superconducting structures that are used in such circuits.

The presently available quantum circuits are formed using materials that become superconducting at cryogenically low temperatures, e.g., at about 10-100 millikelvin (mK), or about 4 K. The external circuits that connect to a quantum circuit usually operate at room temperature (approximately 270-300 K) or higher. The connections between an external circuit and a q-circuit, e.g., an input line to the q-circuit or an output line from the q-circuit, or both, must therefore be thermally isolated from the external circuit's environment.

To provide this thermal isolation, the lines connecting to a q-circuit pass through a series of one or more dilution fridge stages (compactly referred to herein as "stage", plural "stages"). A dilution fridge is a heat-exchange device which causes a reduction in a temperature of a component as compared to the temperature at which the component is introduced into the dilution fridge, maintains the component at a designated reduced temperature, or both. For example, a dilution fridge stage may reduce the temperature of an input line to a q-circuit and another dilution fridge stage down the line in a series of dilution fridge stages may house the q-circuit.

A signal on a line passing through a stage can contain noise. This noise can be in the microwave frequency spectrum. For the reasons described herein, microwave frequency noise is undesirable when the line and signals relate to quantum computing using q-circuits.

Attenuation of a signal is the process of reducing the amplitude of the signal at a particular frequency or frequency-range. An attenuator is an electronic circuit that is configured to attenuate a particular frequency or frequency-range in an input signal.

A resistive attenuator attenuates a signal frequency by dissipating the energy of the signal at the frequency in a resistive component of the attenuator. A dispersive attenuator attenuates a signal frequency by reflecting the energy of the signal at the frequency back in the input signal line.

A critical temperature of a superconducting material is a temperature at which the material begins to exhibit characteristics of superconductivity. The presently available attenuators are formed using materials that become superconducting at cryogenically low temperatures, e.g., at about 1-10 Kelvin (K). Superconducting materials exhibit very low or zero resistivity to the flow of current. Due to the decrease in resistivity, the presently available resistive attenuators, dispersive attenuators with resistive components, and hybrid dispersive-resistive attenuators are adversely affected during operation at or below critical temperatures. A critical field is the highest magnetic field, for a given temperature, under which a material remains superconducting.

SUMMARY

The illustrative embodiments provide an electronic attenuating device, and a method and system of fabrication therefor. A device of an embodiment includes an attenuator configured to attenuate a plurality of frequencies in a microwave signal. In the embodiment, the attenuator comprises a component of a first material. In the embodiment, the first material exhibits superconductivity in a cryogenic temperature range.

In an embodiment, the device includes a magnet configured to generate a magnetic field at the attenuator. In the embodiment, the magnetic field is at least equal to a critical magnetic field strength of the first material. In the embodiment, the critical magnetic field strength causes the first material to become non-superconductive in the cryogenic temperature range.

In an embodiment, the device includes a housing formed of a second material. In an embodiment, the second material exhibits a threshold level of thermal conductivity in a cryogenic temperature range.

In an embodiment, the housing further includes a support plate configured to support the magnet. In an embodiment, the housing is formed of a third material. In an embodiment, the third material exhibits a threshold level of thermal conductivity in a cryogenic temperature range.

In an embodiment, the magnet and the attenuator are disposed on opposite sides of the support plate. In an embodiment, the thickness of the support plate between the attenuator and the magnet allows the magnet to produce the magnetic field of at least the critical magnetic field strength at the first material in the attenuator.

In an embodiment, the magnet is a permanent magnet. In an embodiment, the magnet is one of a neodymium magnet and alnico magnet.

In an embodiment, the critical magnet field of the first material is in a range between 0.1 and 0.3 Tesla, inclusive of both ends of the range.

In an embodiment, the device includes a printed circuit board, wherein the attenuator is coupled to the printed circuit board. In an embodiment, the device includes a set of transmission lines configured to transmit signals between the printed circuit board and the attenuator.

In an embodiment, the magnet is coupled to the printed circuit board. In an embodiment, the magnet and the attenuator are disposed on opposite sides of the printed circuit board. In an embodiment, a thickness of the printed circuit board between the attenuator and the magnet allows the magnet to produce the magnetic field of at least the critical magnetic field strength at the first material in the attenuator. In an embodiment, the magnet is coupled to the attenuator.

An embodiment includes a fabrication method for fabricating the superconducting device. In an embodiment, the method configures an attenuator to attenuate a plurality of frequencies in a microwave signal. In an embodiment, the method generates a magnetic field at the attenuator.

In an embodiment, the method forms a housing of a second material, wherein the second material exhibits a threshold level of thermal conductivity in a cryogenic temperature range.

In an embodiment, the method forms a support plate of a third material, wherein the third material exhibits a threshold level of thermal conductivity in a cryogenic temperature range, the support plate configured to support the magnet.

In an embodiment, the method couples the attenuator to a printed circuit board. In an embodiment, the method transmits signals on a set of transmission lines between the printed circuit board and the attenuator.

An embodiment includes a fabrication system for fabricating the superconducting device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
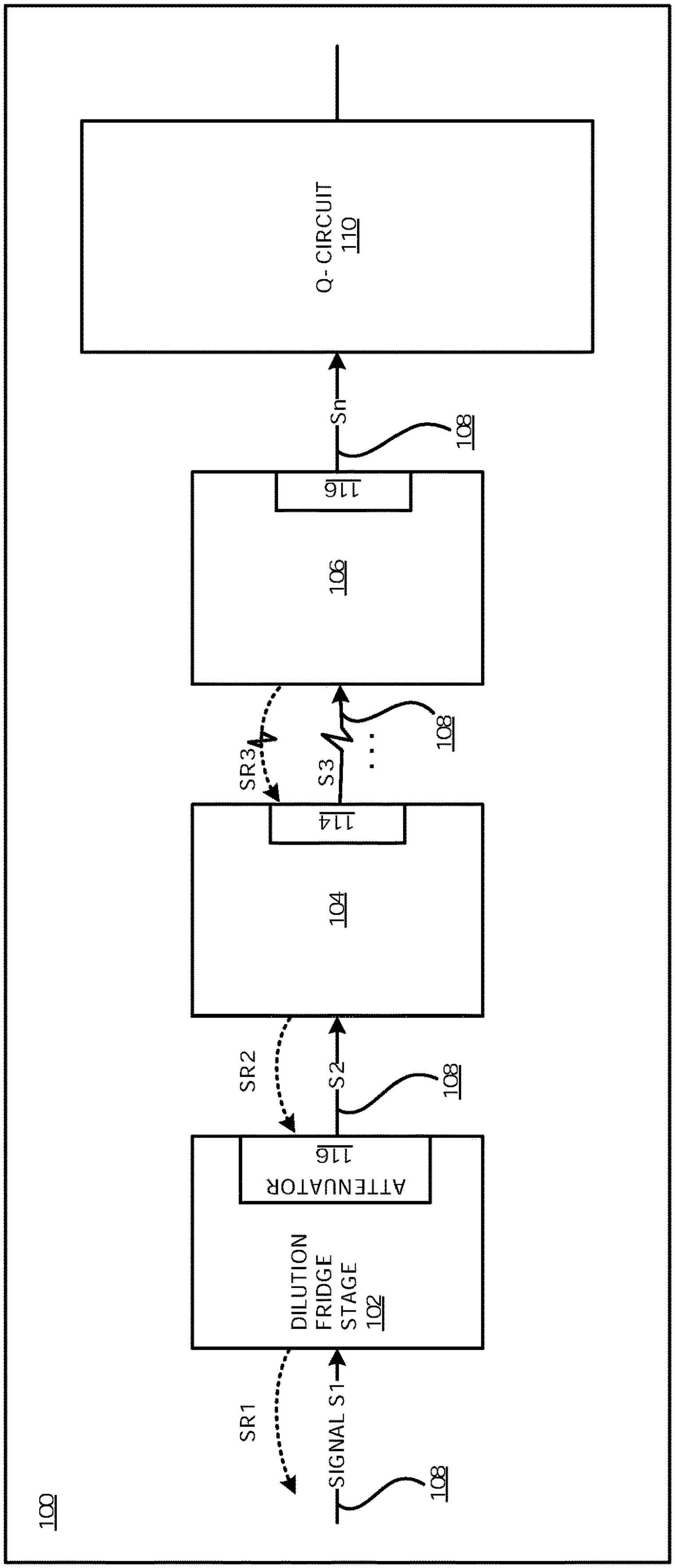
FIG. 1 depicts a block diagram of an example configuration of line conditioning for quantum computing devices in accordance with an illustrative embodiment.

The illustrative embodiments used to describe the invention generally address and solve the above-described needs for attenuating certain microwave signals in the lines connecting to q-circuits while operating at cryogenic temperatures. The illustrative embodiments provide a device, method, and system for enabling attenuators to operate with quantum microwave circuits in cryogenic temperature range, which address the above-described need or problem.

An operation described herein as occurring with respect to a frequency of frequencies should be interpreted as occurring with respect to a signal of that frequency or frequencies. All references to a "signal" are references to a microwave signal unless expressly distinguished where used. Within the scope of the illustrative embodiments, temperatures at ninety-three degrees Kelvin and below are regarded as cryogenic temperatures.

In a superconductive state, the material firstly offers no resistance to the passage of electrical current. When resistance falls to zero, a current can circulate inside the material without any dissipation of energy. Secondly, the material exhibits Meissner effect, i.e., provided they are sufficiently weak, external magnetic fields do not penetrate the superconductor, but remain at its surface. When one or both of these properties are no longer exhibited by the material, the material is said to be no longer superconducting.

The illustrative embodiments recognize that commercially available standard microwave attenuators become superconducting at temperatures in a cryogenic temperature range. The illustrative embodiments recognize that superconductivity adversely affects microwave attenuators by reducing resistivity and therefore attenuation of presently available dispersive and hybrid dispersive-resistive microwave attenuators.

An embodiment provides a configuration of a microwave circuit that enables a microwave attenuator in cryogenic temperature range. Another embodiment provides a fabrication method for the microwave circuit, such that the method can be implemented as a software application. The application implementing a fabrication method embodiment can be configured to operate in conjunction with an existing semiconductor fabrication system—such as a lithography system, or a circuit assembly system.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the example resistors, inductors, capacitors, and other circuit components are used in the figures and the illustrative embodiments. In an actual fabrication or circuit, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for fabricating a circuit using a variety of components that can be purposed or repurposed to provide a described function within a hybrid attenuator, and such adaptations are contemplated within the scope of the illustrative embodiments.

The illustrative embodiments are described with respect to certain types of materials, electrical properties, magnetic properties, steps, numerosity, frequencies, circuits, components, and applications only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to FIG. 1, this figure depicts a block diagram of an example configuration of line conditioning for quantum computing devices in accordance with an illustrative embodiment. Configuration 100 comprises a set of one or more dilution fridge stages 102, 104, . . . 106. Input line 108 connects an external circuit to q-circuit 110. Assuming that line 108 carries a microwave signal to q-circuit 110, signal $S_1$ is a signal which includes microwave noise that is to be attenuated. Signal $S_n$ is the clean signal that reaches q-circuit 110.

One embodiment configures an attenuator with some but not all of stages 102-106. Another embodiment configures an attenuator with each of stages 102-106, as shown in FIG. 1. For example, attenuator 112 is configured to operate with stage 102. Attenuator 112 receives input signal $S_1$ and reflected signal $S_{R2}$ from subsequent stages in the series of stages. Attenuator 112 attenuates one frequency or frequency band from the $(S_1+S_{R2})$ signal to produce signal $S_2$.

Attenuator 114 is configured to operate with stage 104. Attenuator 114 receives input signal $S_2$ and reflected signal $S_{R3}$ from subsequent stages in the series of stages. Attenuator 114 attenuates a different frequency or frequency band from the $(S_2+S_{R3})$ signal to produce signal $S_3$. Operating in this manner, stage 116 (stage n) has attenuator 116 configured therewith. Attenuator 116 receives input signal $S_{n-1}$ (and possibly a reflected signal if q-circuit 110 is configured to reflect any signal frequencies, not shown) from previous stages in the series of stages. Attenuator 116 attenuates a different frequency or frequency band from the ($S_{n-1}$+ any reflected frequencies) signal to produce signal $S_n$, which forms an input to q-circuit 110.

Figure 2:
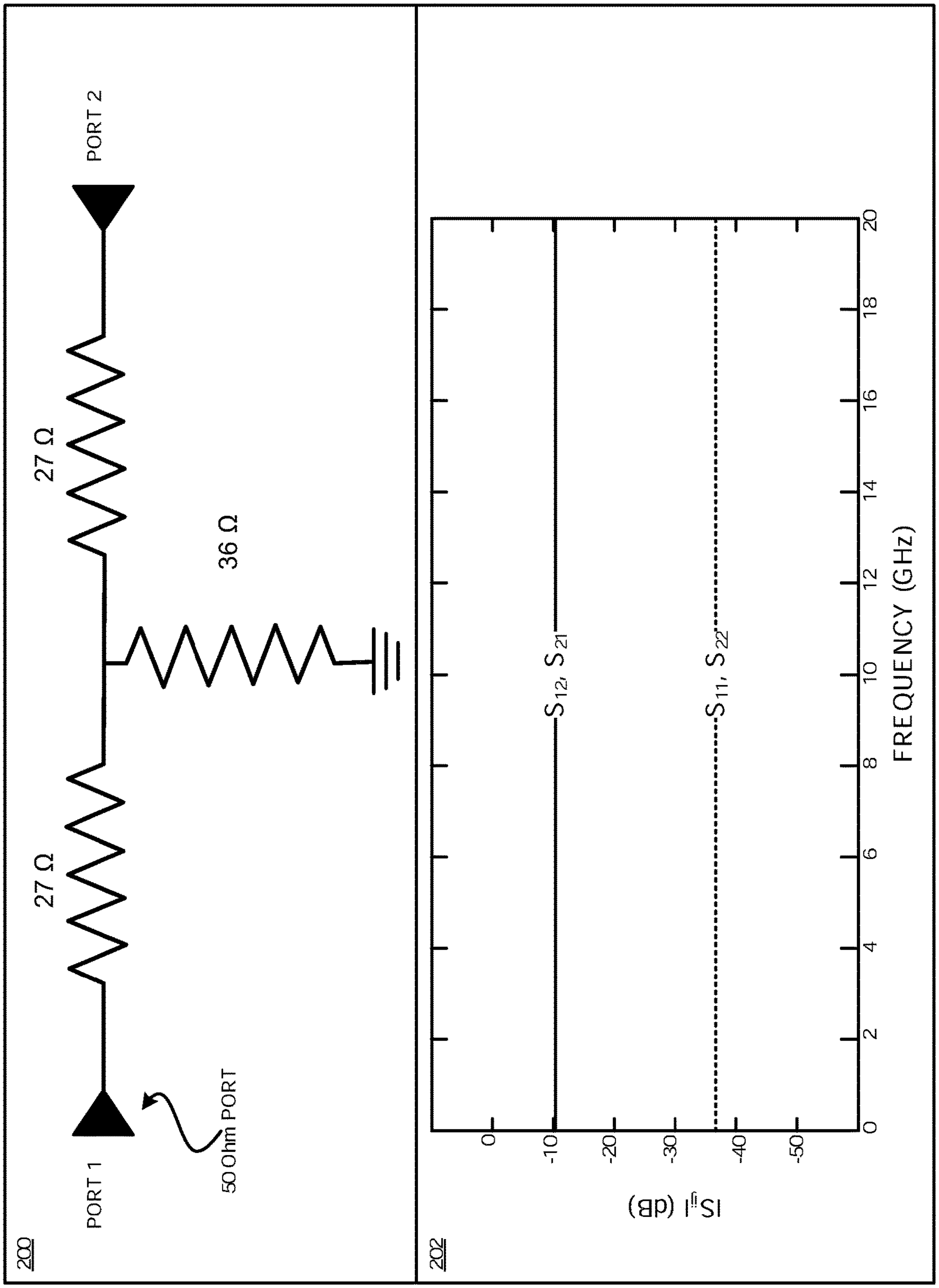
FIGURE 2 (PRIOR ART)
FIG. 2 depicts a resistive microwave attenuator which can be used as a component in a microwave attenuator in accordance with an illustrative embodiment.

With reference to FIG. 2, this figure depicts a presently available resistive microwave attenuator which can be used as a component in a microwave attenuator in accordance with an illustrative embodiment. Circuit 200 depicts three lumped resistive components arranged in a T-arrangement to form the resistive attenuator between two ports—port 1 and port 2. Signal S12 is a signal from port 1 to port 2, signal S21 is a signal from port 2 to port 1, signal S11 is a reflected signal on port 1, and signal S22 is a reflected signal on port 2.

Graph 202 depicts the attenuation characteristics of resistive attenuator 200. As can be seen in graph 202, attenuator 200 provides uniform attenuation of signals S11 and S22 across all frequencies depicted on the X-axis, and passes signals S12 and S21. The energy from attenuating signals S11 and S22 is dissipated as heat within circuit 200.

Figure 3:
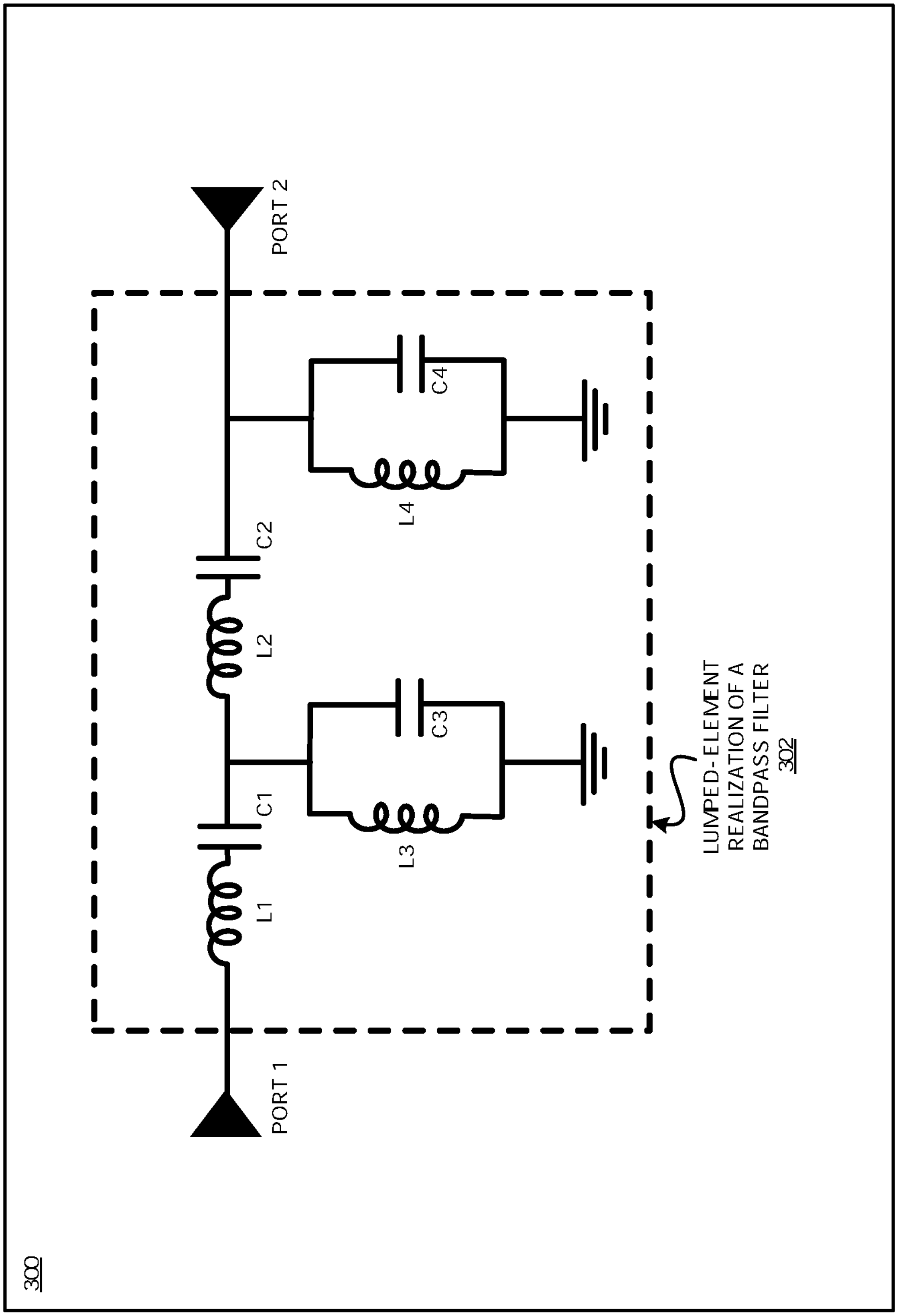
FIGURE 3 (PRIOR ART)
FIG. 3 depicts an example circuit implementing an attenuator in accordance with an illustrative embodiment.

With reference to FIG. 3, this figure depicts an example circuit 300 implementing an attenuator in accordance with an illustrative embodiment. Component 302 is a dispersive element which implements a bandpass filter to allow a frequency band that is between two threshold frequencies (and filters/blocks frequencies outside this pass band).

Component 302 comprises a configuration of inductive and capacitive elements L3 and C3 in parallel and coupled to ground, i.e., the external conductor of the microwave attenuator. L3-C3 couple to L1-C1 series and L2-C2 series via an internal conductor of the microwave attenuator on the other side, as shown. Component 206 also comprises a configuration of inductive and capacitive elements L4 and C4 in parallel and coupled to ground, i.e., the external conductor of the microwave attenuator. L4-C4 couple to L2-C2 series via an internal conductor of the microwave attenuator on the other side, as shown. The depiction of component 302 and elements L1-L4 and C1-04 are lumped realizations, i.e., a representation of an effective function of component 302 as a bandpass filter in the microwave frequency band. This example shows a simple one-unit-cell, bandpass filter. This design also covers cases in which the simple bandpass filter shown in FIG. 3 is replaced by a more sophisticated bandpass filter that consists of several unit cells and whose attenuation, transmission, bandwidth, cutoff frequency, and ripples characteristics are optimized further or differently.

In component 302, capacitive elements C1 and C2 on the internal conductor of the microwave attenuator serves as DC blocks, which can be used to eliminate the formation of ground loops in the fridge. Such ground loops are undesirable as they can generate electronic noise. Inductive element L3 connected the center and external conductors of the microwave attenuator offers a path of negligible resistance between the center conductor and the external conductor of the microwave attenuator.

The lumped realization of component 302 is not intended to be limiting. From this disclosure, those of ordinary skill in the art will be able to conceive many other implementations for a depicted lumped realization, e.g., using additional or different elements to achieve a similar function of the lumped realization shown here, and such implementations are contemplated within the scope of the illustrative embodiments.

Figure 4:
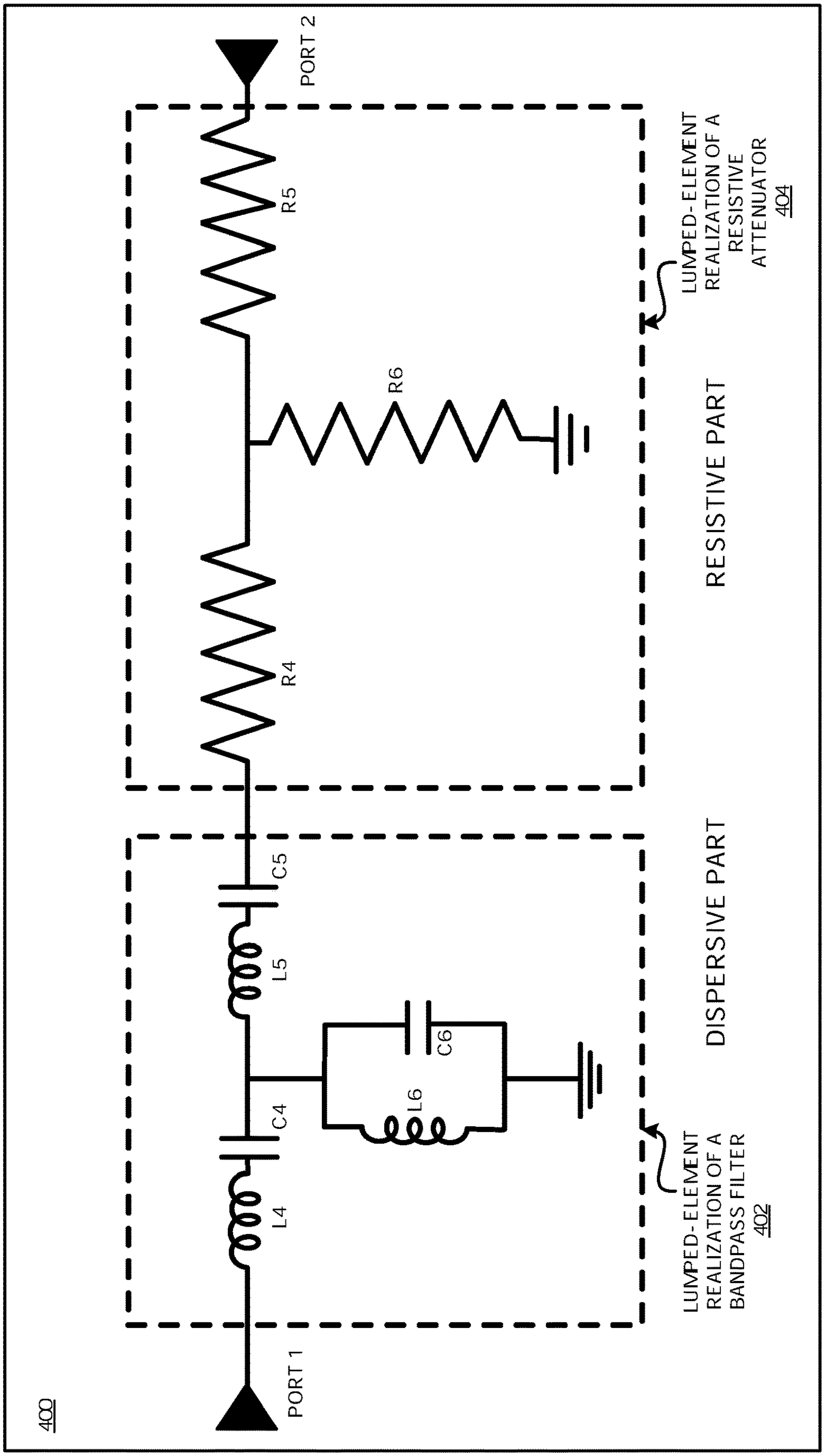
FIGURE 4 (PRIOR ART)
FIG. 4 depicts an example circuit implementing a hybrid attenuator in accordance with an illustrative embodiment.

With reference to FIG. 4, this figure depicts an example circuit implementing a hybrid attenuator in accordance with an illustrative embodiment. Component 404 is a resistive filter and implements resistive attenuator in a manner similar to component 200 of FIG. 2. Component 402 is a dispersive filter and implements a bandpass filter in a manner similar to component 302 of FIG. 3.

Component 404 comprises a T-arrangement of resistor elements R4, R5, and R6, as in FIG. 2. Note that the depiction of component 404 and resistors R4, R5, and R6 are lumped realizations, i.e., a representation of an effective function of component 404 as a resistive attenuator in the microwave frequency band.

Component 402 comprises a T-arrangement of capacitive elements L6 and C6 in parallel and coupled to ground or an external conductor on one side. L6-C6 couple to L4-C4 series and L5-05 series via an internal conductor on the other side, as shown. The depiction of component 402 and elements L4-L6 and C4-C6 are lumped realizations, i.e., a representation of an effective function of component 402 as a bandpass filter in the microwave frequency band.

In component 402, capacitive elements C4 and C5 operate as DC blocks. Inductive element L6 offers a path of negligible resistance between the internal conductor and the external conductor.

The lumped realizations of components 402 and 404 are not intended to be limiting. From this disclosure, those of ordinary skill in the art will be able to conceive many other implementations for a depicted lumped realization, e.g., using additional or different elements to achieve a similar function of the lumped realization shown here, and such implementations are contemplated within the scope of the illustrative embodiments.

Figure 5:
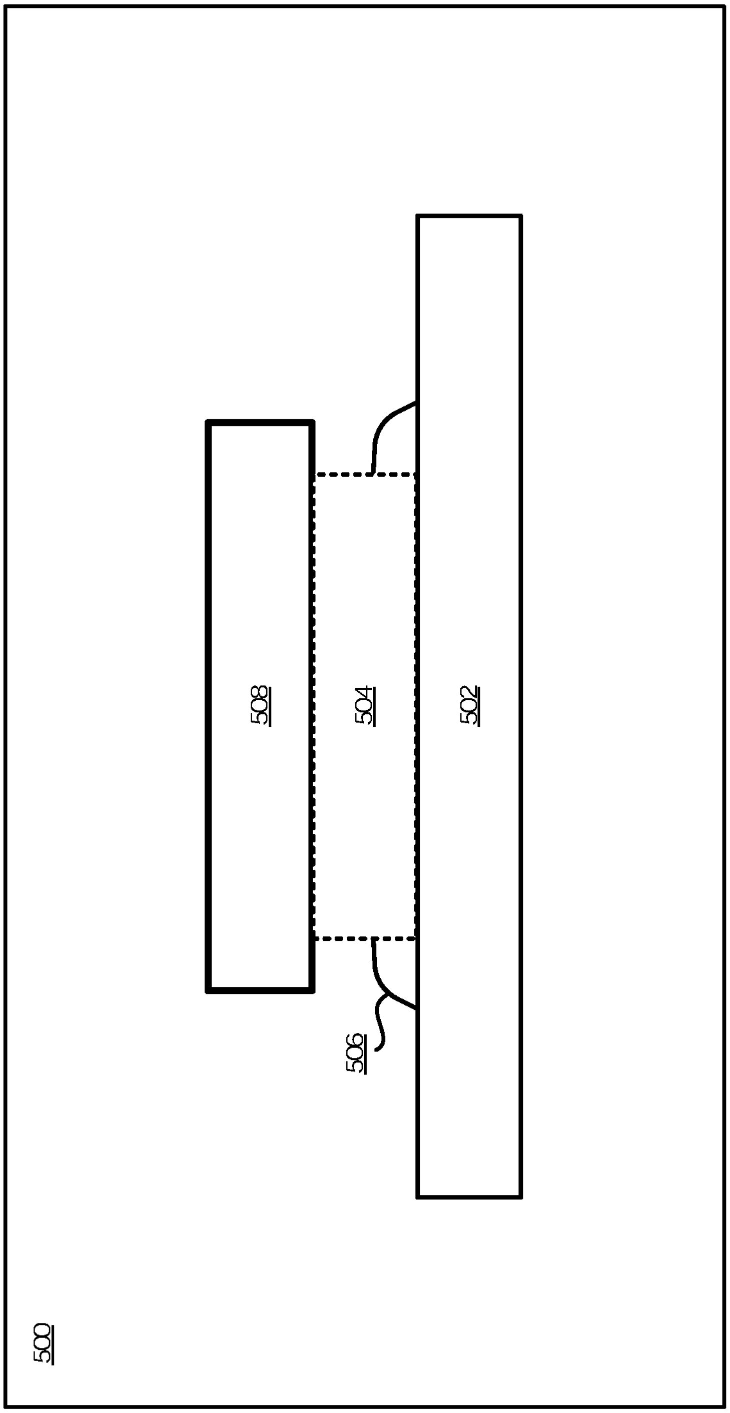
FIG. 5 depicts an example configuration of a microwave circuit in accordance with an illustrative embodiment.

With reference to FIG. 5, this figure depicts one example configuration of a microwave circuit in accordance with an illustrative embodiment. The example configuration 500 in this figure comprises printed circuit board 502, microwave attenuator 504, a set of transmission lines, such as wirebonds 506, and magnet 508. The components can be arranged in a variety of arrangements within the scope of the illustrative embodiments.

In an embodiment, microwave attenuator 504 is a dispersive-resistive hybrid attenuator and can be implemented as a two-port integrated circuit. Microwave attenuator 504 is disposed on the surface of printed circuit board 502. One embodiment couples microwave attenuator 504 to printed circuit board 502. As a non-limiting example, microwave attenuator 504 can be bonded to printed circuit board 502. This example of a coupling between the printed circuit board and microwave attenuator is not intended to be limiting. From this disclosure, those of ordinary skill in the art will be able to conceive many other materials and methods suitable for coupling the attenuator and the printed circuit board and the same are contemplated within the scope of the illustrative embodiments. Wirebonds 506 transmit signals between the printed circuit board 502 and the microwave attenuator 504.

In an embodiment, components of microwave attenuator 504 are disposed within an outer housing (not shown). In an embodiment, components of microwave attenuator 504 comprise a material with high thermal conductivity (above a threshold thermal conductivity) in the cryogenic temperature range. In an embodiment, attenuator components are formed using a material that exhibits a Residual Resistance Ratio (RRR) of at least 100, and a thermal conductivity of greater than 1 W/(cm*K) at 4 Kelvin, threshold level of thermal conductivity. RRR is the ratio of the resistivity of a material at room temperature and at 0 K. Because 0 K cannot be reached in practice, an approximation at 4 K is used. For example, attenuator components may be formed using nickel-chrome, copper-nickel, or tantalum nitride. These examples of materials are not intended to be limiting. From this disclosure, those of ordinary skill in the art will be able to conceive many other materials suitable for forming the attenuator components and the same are contemplated within the scope of the illustrative embodiments.

In an embodiment, components of microwave attenuator 504 comprise a material which exhibits superconductivity in a portion of the cryogenic temperature range. In an embodiment, attenuator components are formed using a material that exhibits superconductivity in a temperature range of about 1-10 Kelvin, inclusive of both ends of the temperature range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

In an embodiment, components of microwave attenuator 504 comprise a material which stops being superconductive when exposed to a threshold magnetic field (at or above a critical field) in a portion of the cryogenic temperature range. In an embodiment, attenuator components are formed using a material that stops being superconductive in a temperature range of about 1-10 Kelvin when exposed to a threshold magnetic field of about 0.1-0.3 Tesla, inclusive of both ends of the range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

Magnet 508 generates a magnetic field at the microwave attenuator 504 such that the flux of the magnetic field penetrates microwave attenuator 504. One embodiment configures magnet 504 to generate a magnetic field at the microwave attenuator 504 to cause a component of microwave attenuator 504 to change from a superconductive state to a non-superconductive state. In an embodiment, magnet 508 generates a threshold magnetic field at or above a critical field of a material of the microwave attenuator 504. One embodiment couples magnet 508 directly to microwave attenuator 504. For example, magnet 508 can be bonded to microwave attenuator 504. This example of a coupling between the magnet and microwave attenuator is not intended to be limiting. From this disclosure, those of ordinary skill in the art will be able to conceive many other materials and methods suitable for coupling the attenuator and the magnet and the same are contemplated within the scope of the illustrative embodiments. Regardless of the type of coupling used in an embodiment or an adaptation of an embodiment, magnet 508 should remain disposed relative to microwave attenuator 504 in such a manner that sufficient flux from magnet 508 is presented at a component of microwave attenuator 504 to cause the component to become non-superconductive as a result of the flux.

In an embodiment, magnet 508 comprises a permanent magnet which generates a greater than a threshold units of magnetic field. In another embodiment, magnet 508 comprises an electromagnet which generates a greater than a threshold units of magnetic field. For example, in one embodiment, magnet is formed using a material and structure that exhibits a magnetic field of at least one Tesla, threshold level of magnetic field. For example, magnet may be formed using neodymium or alnico. These examples of material are not intended to be limiting. From this disclosure, those of ordinary skill in the art will be able to conceive many other materials suitable for forming the magnet and the same are contemplated within the scope of the illustrative embodiments.

In an embodiment, magnet 508 is located in close proximity to the components of the microwave attenuator 504. In an embodiment, magnet 508 is located at a distance such that the magnetic field at the microwave attenuator 504 is at least equal to a critical magnetic field strength of the material forming a component of the microwave attenuator 504. In an embodiment, magnet 508 is located at or within a distance of one millimeter from the components of the microwave attenuator 504. This example of a distance is not intended to be limiting. From this disclosure, those of ordinary skill in the art will be able to conceive many other distances suitable for locating the magnet and the same are contemplated within the scope of the illustrative embodiments.

Figure 6:
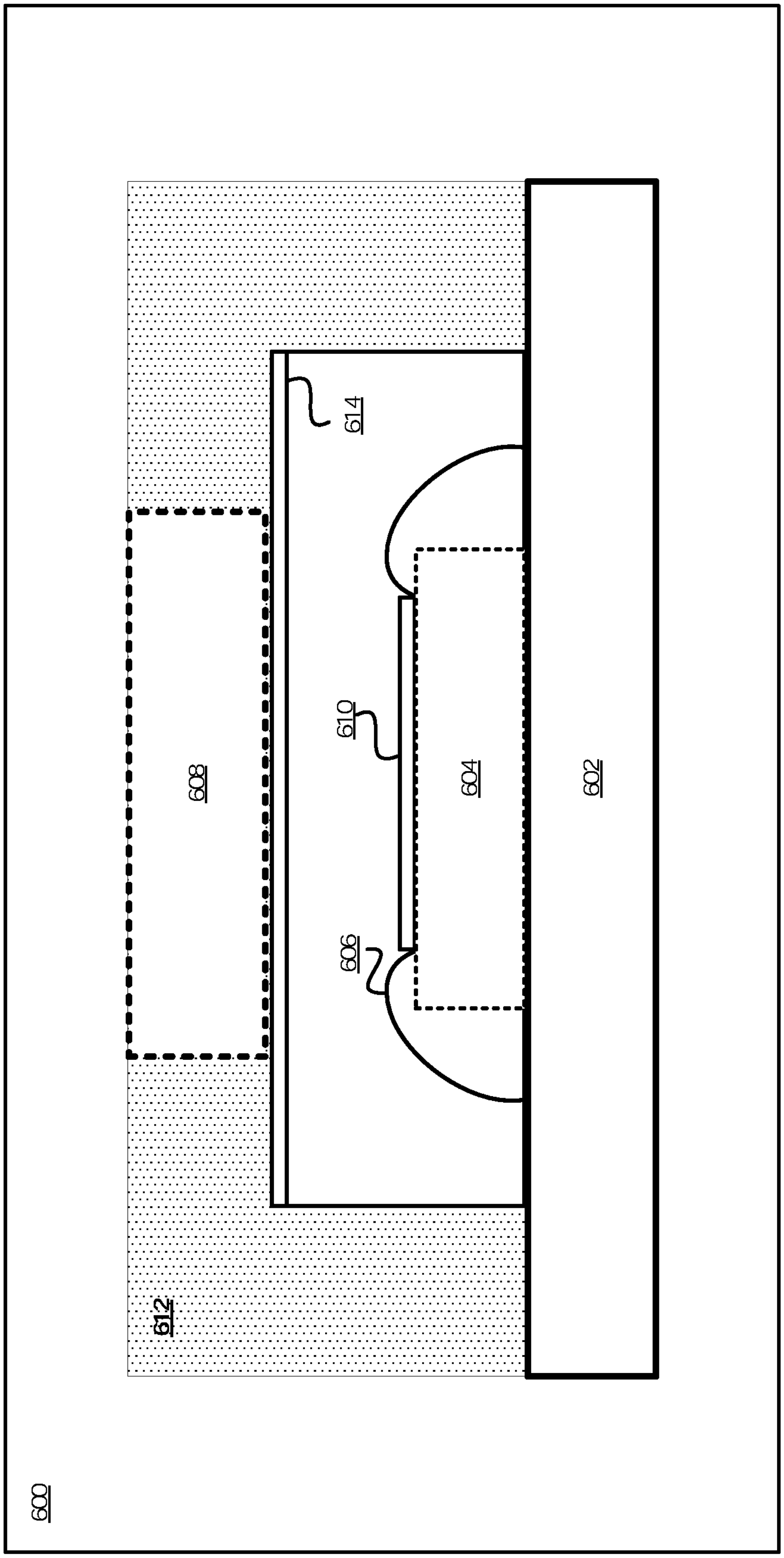
FIG. 6 depicts an example configuration of a microwave circuit in accordance with an illustrative embodiment.

With reference to FIG. 6, this figure depicts an example configuration 600 of a microwave circuit in accordance with an illustrative embodiment. The example configuration 600 in this figure comprises printed circuit board 602, microwave attenuator 604, a set of transmission lines, such as wirebonds 606, magnet 608, attenuator components 610, housing 612, and support plate 614. The components can be arranged in a variety of arrangements within the scope of the illustrative embodiments.

Microwave attenuator 604 is disposed on the surface of printed circuit board 602. One embodiment couples microwave attenuator 604 to printed circuit board 602. Wirebonds 606 transmit signals between the printed circuit board 602 and components 610 of microwave attenuator 604.

One embodiment configures components 610 of microwave attenuator 604 to be exposed. In an embodiment, components 610 comprise a material with high thermal conductivity (above a threshold) in the cryogenic temperature range. In an embodiment, components 610 are formed using a material that exhibits a Residual Resistance Ratio of at least 100, and a thermal conductivity of greater than 1 W/(cm*K) at 4 Kelvin, threshold level of thermal conductivity. RRR is the ratio of the resistivity of a material at room temperature and at 0 K. Because 0 K cannot be reached in practice, an approximation at 4 K is used. For example, attenuator components may be formed using nickel-chrome, copper-nickel, or tantalum nitride. These examples of materials are not intended to be limiting. From this disclosure, those of ordinary skill in the art will be able to conceive many other materials suitable for forming the attenuator components and the same are contemplated within the scope of the illustrative embodiments.

In an embodiment, components 610 of microwave attenuator 604 comprise a material which exhibits superconductivity in a portion of the cryogenic temperature range. In an embodiment, attenuator components are formed using a material that exhibits superconductivity in a temperature range of about 1-10 Kelvin, inclusive of both ends of the temperature range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

In an embodiment, components of microwave attenuator 604 comprise a material which stops being superconductive when exposed to a threshold magnetic field (at or above a critical field) in a portion of the cryogenic temperature range. In an embodiment, attenuator components are formed using a material that stops being superconductive in a temperature range of about 1-10 Kelvin when exposed to a threshold magnetic field of about 0.1-0.3 Tesla, inclusive of both ends of the range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

Magnet 608 generates a magnetic field at the microwave attenuator 604. One embodiment configures magnet 608 to generate a magnetic field at the microwave attenuator 604 to stop components 610 of microwave attenuator 604 from being superconductive. In an embodiment, magnet 608 generates a threshold magnetic field at or above a critical field of a material of the microwave attenuator 604. One embodiment disposes magnet 608 directly above microwave attenuator 604. For example, magnet 608 can be disposed in a housing 612 above microwave attenuator 604. In an embodiment, housing 612 has a thickness of at maximum one millimeter. This example of a location between the magnet and microwave attenuator is not intended to be limiting. From this disclosure, those of ordinary skill in the art will be able to conceive many other materials suitable for connecting the attenuator and the magnet and the same are contemplated within the scope of the illustrative embodiments.

In an embodiment, magnet 608 comprises a permanent magnet which generates a strong magnetic field (above a threshold). In an embodiment, magnet is formed using a material that exhibits a magnetic field of at least one Tesla, threshold level of magnetic field. For example, magnet may be formed using neodymium or alnico. These examples of material are not intended to be limiting. From this disclosure, those of ordinary skill in the art will be able to conceive many other materials suitable for forming the magnet and the same are contemplated within the scope of the illustrative embodiments.

One embodiment couples magnet 608 to housing 612. For example, magnet 608 can be bonded to housing 612. This example of a coupling between the magnet and housing is not intended to be limiting. From this disclosure, those of ordinary skill in the art will be able to conceive many other materials and methods suitable for coupling the housing and the magnet and the same are contemplated within the scope of the illustrative embodiments.

In an embodiment, housing 612 includes a support plate 614. In an embodiment, support plate 614 has a thickness of at maximum one millimeter. In an embodiment, support plate 614 includes a thickness between the attenuator 604 and the magnet 608 which allows the magnet 608 to produce the magnetic field of at least the critical magnetic field strength at the material of component 610 in the attenuator 604. In an embodiment, magnet 608 rests on support plate 614. One embodiment configures support plate 614 to support a weight of the magnet 608. One embodiment couples magnet 608 to support plate 614. For example, magnet 608 can be bonded to support plate 614. This example of a coupling between the magnet and support plate is not intended to be limiting. From this disclosure, those of ordinary skill in the art will be able to conceive many other materials and methods suitable for coupling the housing and the magnet and the same are contemplated within the scope of the illustrative embodiments.

In an embodiment, magnet 608 is formed using a material that exhibits a magnetic field of at least one Tesla, threshold level of magnetic field. For example, magnet may be formed using neodymium or alnico. These examples of material are not intended to be limiting. From this disclosure, those of ordinary skill in the art will be able to conceive many other materials suitable for forming the magnet and the same are contemplated within the scope of the illustrative embodiments.

In an embodiment, housing 612 is formed using a material that exhibits a Residual Resistance Ratio of at least 100, and a thermal conductivity of greater than 1 W/(cm*K) at 4 Kelvin, threshold level of thermal conductivity. For example, housing may be formed using gold, silver, copper, or aluminum. These examples of materials are not intended to be limiting. From this disclosure, those of ordinary skill in the art will be able to conceive many other materials suitable for forming the housing and the same are contemplated within the scope of the illustrative embodiments.

In an embodiment, support plate 614 is formed using a material that exhibits a Residual Resistance Ratio of at least 100, and a thermal conductivity of greater than 1 W/(cm*K) at 4 Kelvin, threshold level of thermal conductivity. For example, support plate may be formed using gold, silver, copper, or aluminum. These examples of materials are not intended to be limiting. From this disclosure, those of ordinary skill in the art will be able to conceive many other materials suitable for forming the support plate and the same are contemplated within the scope of the illustrative embodiments.

In an embodiment, magnet 608 is located in close proximity (at or within a threshold distance) to the components 610 of the microwave attenuator 604. In an embodiment, magnet 608 is located at a distance such that the magnetic field at the microwave attenuator 604 is at least equal to a critical magnetic field strength of the material forming a component 610 of the microwave attenuator 604. In an embodiment, magnet 608 is located at or within a distance of one millimeter from the components of the microwave attenuator 604. This example of a distance is not intended to be limiting. From this disclosure, those of ordinary skill in the art will be able to conceive many other distances suitable for locating the magnet and the same are contemplated within the scope of the illustrative embodiments.

Figure 7:
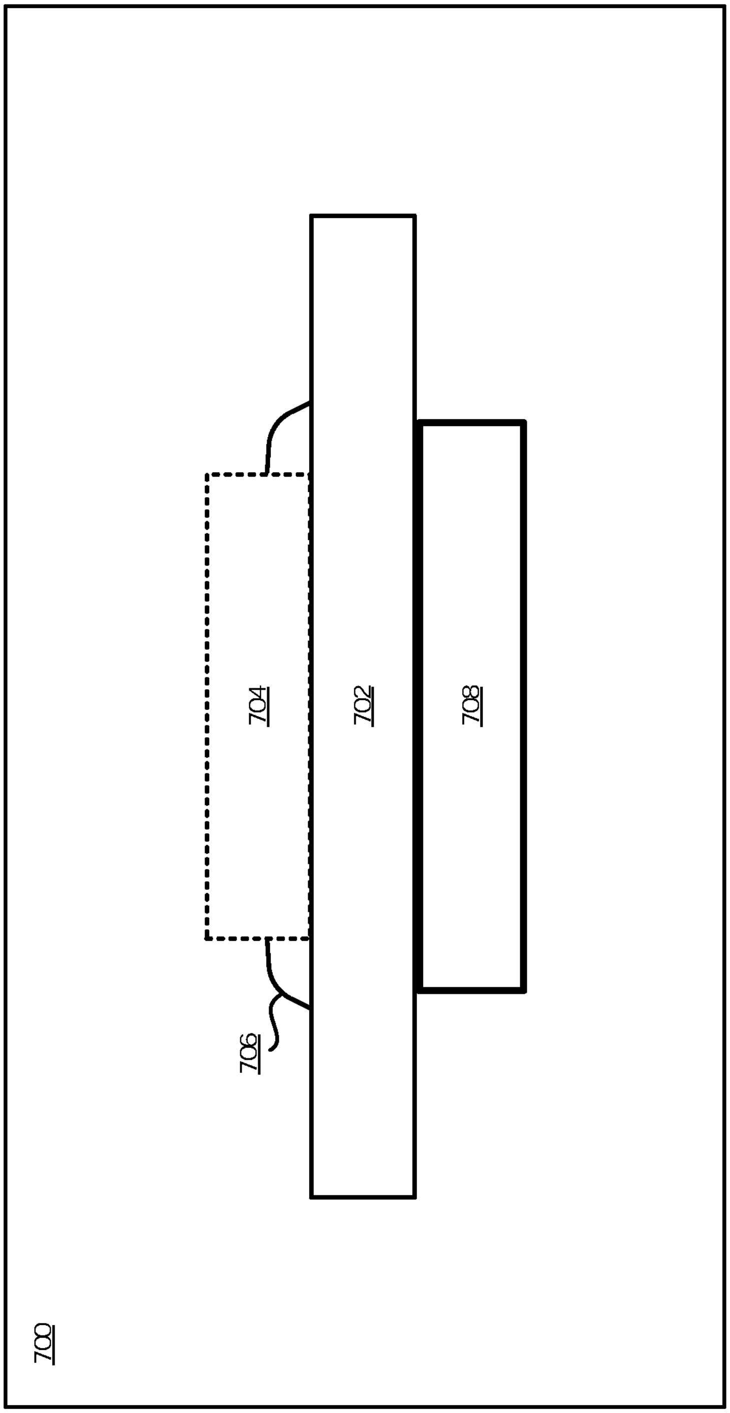
FIG. 7 depicts an example configuration of a microwave circuit in accordance with an illustrative embodiment.

With reference to FIG. 7, this figure depicts an example configuration 700 of a microwave circuit in accordance with an illustrative embodiment. The example configuration 700 in this figure comprises printed circuit board 702, microwave attenuator 704, a set of transmission lines, such as wirebonds 706, and magnet 708. The components can be arranged in a variety of arrangements within the scope of the illustrative embodiments.

In an embodiment, microwave attenuator 704 is a dispersive-resistive hybrid attenuator and can be implemented as a two-port integrated circuit. Microwave attenuator 704 is disposed on the surface of printed circuit board 702. One embodiment couples microwave attenuator 704 to printed circuit board 702. Wirebonds 706 transmit signals between the printed circuit board 702 and the microwave attenuator 704.

In an embodiment, components of microwave attenuator 704 are disposed within an outer housing. In an embodiment, components of microwave attenuator 704 comprise a material with high thermal conductivity (above a threshold) in the cryogenic temperature range. In an embodiment, attenuator components are formed using a material that exhibits a Residual Resistance Ratio of at least 100, and a thermal conductivity of greater than 1 W/(cm*K) at 4 Kelvin, threshold level of thermal conductivity. RRR is the ratio of the resistivity of a material at room temperature and at 0 K. Because 0 K cannot be reached in practice, an approximation at 4 K is used. For example, attenuator components may be formed using nickel-chrome, copper-nickel, or tantalum nitride. These examples of materials are not intended to be limiting. From this disclosure, those of ordinary skill in the art will be able to conceive many other materials suitable for forming the attenuator components and the same are contemplated within the scope of the illustrative embodiments.

In an embodiment, components of microwave attenuator 704 comprise a material which exhibits superconductivity in a portion of the cryogenic temperature range. In an embodiment, attenuator components are formed using a material that exhibits superconductivity in a temperature range of about 1-10 Kelvin, inclusive of both ends of the temperature range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

In an embodiment, components of microwave attenuator 704 comprise a material which stops being superconductive when exposed to a threshold magnetic field (at or above a critical field) in a portion of the cryogenic temperature range. In an embodiment, attenuator components are formed using a material that stops being superconductive in a temperature range of about 1-10 Kelvin when exposed to a threshold magnetic field of about 0.1-0.3 Tesla, inclusive of both ends of the range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

Magnet 708 generates a magnetic field at the microwave attenuator 704. One embodiment configures magnet 704 to generate a magnetic field at the microwave attenuator 704 to stop components of microwave attenuator 704 being superconductive. In an embodiment, magnet 708 generates a threshold magnetic field at or above a critical field of a material of the microwave attenuator 704. In an embodiment, printed circuit board 702 includes a thickness between the attenuator 704 and the magnet 708 which allows the magnet 708 to produce the magnetic field of at least the critical magnetic field strength at the material of a component in the attenuator 704. One embodiment disposes magnet 708 directly on printed circuit board 702. For example, magnet 708 can be bonded to printed circuit board 702. This example of a coupling between the magnet and printed circuit board is not intended to be limiting. From this disclosure, those of ordinary skill in the art will be able to conceive many other materials and methods suitable for coupling the printed circuit board and the magnet and the same are contemplated within the scope of the illustrative embodiments.

In an embodiment, magnet 708 comprises a permanent magnet which generates a strong magnetic field (above a threshold). In an embodiment, magnet is formed using a material that exhibits a magnetic field of at least one Tesla, threshold level of magnetic field. For example, magnet may be formed using neodymium or alnico. These examples of material are not intended to be limiting. From this disclosure, those of ordinary skill in the art will be able to conceive many other materials suitable for forming the magnet and the same are contemplated within the scope of the illustrative embodiments.

In an embodiment, magnet 708 is located in close proximity (at or within a threshold distance) to the components of the microwave attenuator 704. In an embodiment, magnet 708 is located at a distance such that the magnetic field at the microwave attenuator 704 is at least equal to a critical magnetic field strength of the material forming a component of the microwave attenuator 704. In an embodiment, magnet 708 is located at or within a distance of one millimeter from the components of the microwave attenuator 704. This example of a distance is not intended to be limiting. From this disclosure, those of ordinary skill in the art will be able to conceive many other distances suitable for locating the magnet and the same are contemplated within the scope of the illustrative embodiments.

Figure 8:
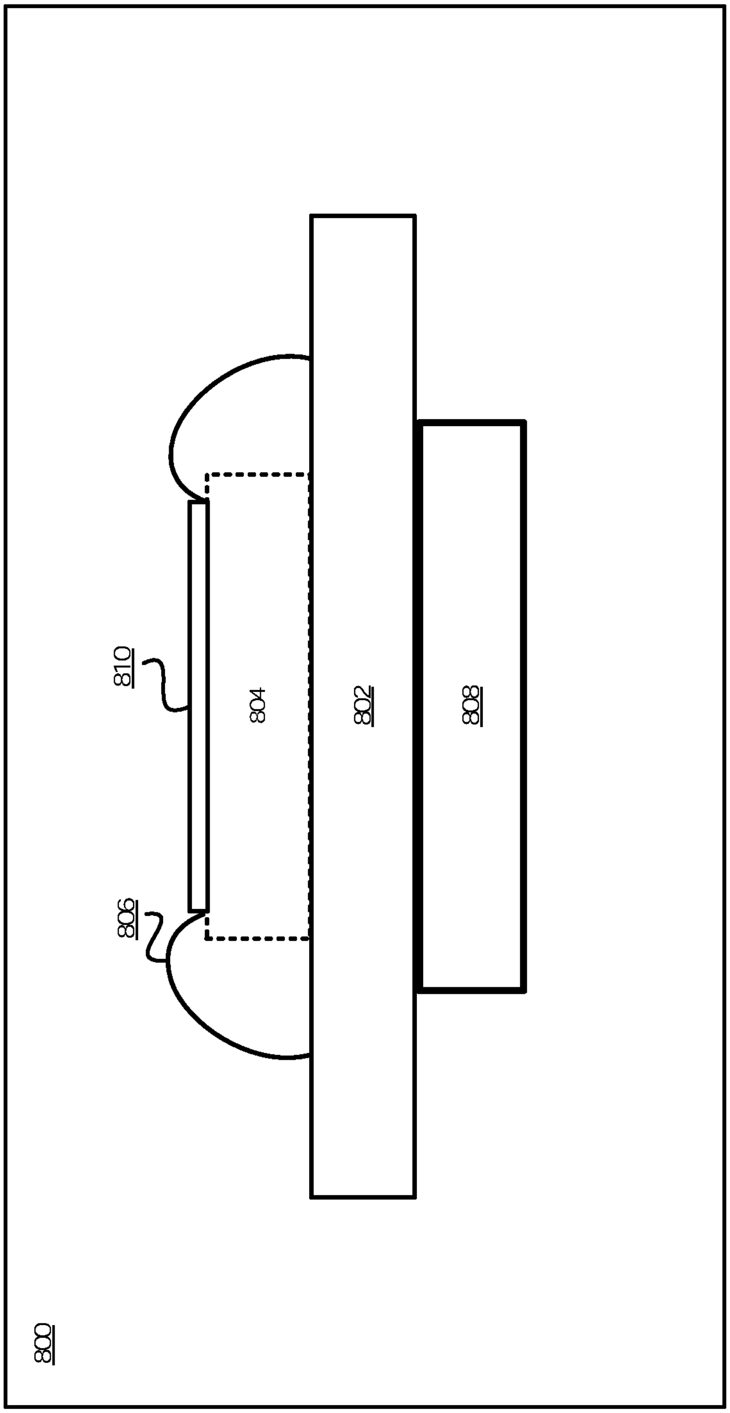
FIG. 8 depicts an example configuration of a microwave circuit in accordance with an illustrative embodiment.

With reference to FIG. 8, this figure depicts an example configuration 800 implementing a microwave circuit in accordance with an illustrative embodiment. The example configuration 800 in this figure comprises printed circuit board 802, microwave attenuator 804, a set of transmission lines, such as wirebonds 806, magnet 808, and attenuator components 810. The components can be arranged in a variety of arrangements within the scope of the illustrative embodiments.

In an embodiment, microwave attenuator 804 is a dispersive-resistive hybrid attenuator and can be implemented as a two-port integrated circuit. Microwave attenuator 804 is disposed on the surface of printed circuit board 802. One embodiment couples microwave attenuator 804 to printed circuit board 802. Wirebonds 806 transmit signals between the printed circuit board 802 and the components 810 of the microwave attenuator 804.

One embodiment configures components 810 of microwave attenuator 804 to be exposed. In an embodiment, components 810 comprise a material with high thermal conductivity (above a threshold) in the cryogenic temperature range. In an embodiment, components 810 are formed using a material that exhibits a Residual Resistance Ratio of at least 100, and a thermal conductivity of greater than 1 W/(cm*K) at 4 Kelvin, threshold level of thermal conductivity. RRR is the ratio of the resistivity of a material at room temperature and at 0 K. Because 0 K cannot be reached in practice, an approximation at 4 K is used. For example, attenuator components may be formed using nickel-chrome, copper-nickel, or tantalum nitride. These examples of materials are not intended to be limiting. From this disclosure, those of ordinary skill in the art will be able to conceive many other materials suitable for forming the attenuator components and the same are contemplated within the scope of the illustrative embodiments.

In an embodiment, components 810 of microwave attenuator 804 comprise a material which exhibits superconductivity in a portion of the cryogenic temperature range. In an embodiment, attenuator components 810 are formed using a material that exhibits superconductivity in a temperature range of about 1-10 Kelvin, inclusive of both ends of the temperature range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

In an embodiment, components 810 of microwave attenuator 804 comprise a material which stops being superconductive when exposed to a threshold magnetic field (at or above a critical field) in a portion of the cryogenic temperature range. In an embodiment, attenuator components 810 are formed using a material that stops being superconductive in a temperature range of about 1-10 Kelvin when exposed to a threshold magnetic field of about 0.1-0.3 Tesla, inclusive of both ends of the range. For example, attenuator components may be formed using tantalum nitride. This example of material is not intended to be limiting. From this disclosure, those of ordinary skill in the art will be able to conceive many other materials suitable for forming the attenuator components and the same are contemplated within the scope of the illustrative embodiments.

Magnet 808 generates a magnetic field at the microwave attenuator 804. One embodiment configures magnet 804 to generate a magnetic field at the microwave attenuator 804 to stop components of microwave attenuator 804 being superconductive. In an embodiment, magnet 808 generates a threshold magnetic field at or above a critical field of a material of the microwave attenuator 804. In an embodiment, printed circuit board 802 includes a thickness between the attenuator 804 and the magnet 808 which allows the magnet 808 to produce the magnetic field of at least the critical magnetic field strength at the material of a component 810 in the attenuator 804. One embodiment disposes magnet 808 directly on printed circuit board 802. For example, magnet 808 can be bonded to printed circuit board 802. This example of a coupling between the magnet and printed circuit board is not intended to be limiting. From this disclosure, those of ordinary skill in the art will be able to conceive many other materials and methods suitable for coupling the printed circuit board and the magnet and the same are contemplated within the scope of the illustrative embodiments.

In an embodiment, magnet 804 comprises a permanent magnet which generates a strong magnetic field (above a threshold). In an embodiment, magnet is formed using a material that exhibits a magnetic field of at least one Tesla, threshold level of magnetic field. For example, magnet may be formed using neodymium or alnico. These examples of material are not intended to be limiting. From this disclosure, those of ordinary skill in the art will be able to conceive many other materials suitable for forming the magnet and the same are contemplated within the scope of the illustrative embodiments.

In an embodiment, magnet 808 is located in close proximity (at or within a threshold distance) to the components of the microwave attenuator 804. In an embodiment, magnet 808 is located at a distance such that the magnetic field at the microwave attenuator 804 is at least equal to a critical magnetic field strength of the material forming a component 810 of the microwave attenuator 804. In an embodiment, magnet 808 is located at or within a distance of one millimeter from the components of the microwave attenuator 804. This example of a distance is not intended to be limiting. From this disclosure, those of ordinary skill in the art will be able to conceive many other distances suitable for locating the magnet and the same are contemplated within the scope of the illustrative embodiments.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer “A” over layer “B” include situations in which one or more intermediate layers (e.g., layer “C”) is between layer “A” and layer “B” as long as the relevant characteristics and functionalities of layer “A” and layer “B” are not substantially changed by the intermediate layer(s).

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “illustrative” is used herein to mean “serving as an example, instance or illustration.” Any embodiment or design described herein as “illustrative” is not necessarily to be construed as preferred or advantageous over other embodiments or designs. The terms “at least one” and “one or more” are understood to include any integer number greater than or equal to one, i.e. one, two, three, four, etc. The terms “a plurality” are understood to include any integer number greater than or equal to two, i.e. two, three, four, five, etc. The term “connection” can include an indirect “connection” and a direct “connection.”

References in the specification to “one embodiment,” “an embodiment,” “an example embodiment,” etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A microwave circuit (circuit) comprising:

an attenuator configured to attenuate a plurality of frequencies in a microwave signal, wherein the attenuator comprises a component of a first material, the first material exhibiting superconductivity in a cryogenic temperature range; and a magnet configured to generate a magnetic field at the attenuator, wherein the magnetic field is at least equal to a critical magnetic field strength of the first material, wherein the critical magnetic field strength causes the first material to become non-superconductive in the cryogenic temperature range.

2. The circuit of claim 1, wherein the critical magnetic field of the first material is in a range between 0.1 and 0.3 Tesla, inclusive of both ends of the range.

3. The circuit of claim 1, wherein the magnet is coupled to the attenuator.

4. The circuit of claim 1, further comprising:

a housing formed of a second material, wherein the second material exhibits a threshold level of thermal conductivity in a cryogenic temperature range.

5. The circuit of claim 4, the housing further comprising:

a support plate configured to support the magnet, the housing formed of a third material, wherein the third material exhibits a threshold level of thermal conductivity in a cryogenic temperature range.

6. The circuit of claim 5, wherein the magnet and the attenuator are disposed on opposite sides of the support plate, wherein a thickness of the support plate between the attenuator and the magnet allows the magnet to produce the magnetic field of at least the critical magnetic field strength at the first material in the attenuator.

7. The circuit of claim 1, wherein the magnet is a permanent magnet.

8. The circuit of claim 7, wherein the magnet is one of a neodymium magnet and alnico magnet.

9. The circuit of claim 1, further comprising:

a printed circuit board, wherein the attenuator is coupled to the printed circuit board; and a set of transmission lines configured to transmit signals between the printed circuit board and the attenuator.

10. The circuit of claim 9, wherein the magnet is coupled to the printed circuit board.

11. The circuit of claim 9, wherein the magnet and the attenuator are disposed on opposite sides of the printed circuit board, wherein a thickness of the printed circuit board between the attenuator and the magnet allows the magnet to produce the magnetic field of at least the critical magnetic field strength at the first material in the attenuator.

12. A circuit fabrication system performing operations comprising:

configuring an attenuator to attenuate a plurality of frequencies in a microwave signal, wherein the attenuator comprises a component of a first material, the first material exhibiting superconductivity in a cryogenic temperature range; and generating a magnetic field at the attenuator, wherein the magnetic field is at least equal to a critical magnetic field strength of the first material, wherein the critical magnetic field strength causes the first material to become non-superconductive in the cryogenic temperature range.

13. A method comprising:

configuring an attenuator to attenuate a plurality of frequencies in a microwave signal, wherein the attenuator comprises a component of a first material, the first material exhibiting superconductivity in a cryogenic temperature range; and generating a magnetic field at the attenuator, wherein the magnetic field is at least equal to a critical magnetic field strength of the first material, wherein the critical magnetic field strength causes the first material to become non-superconductive in the cryogenic temperature range.

14. The method of claim 13, wherein the critical magnetic field of the first material is in a range between 0.1 and 0.3 Tesla, inclusive of both ends of the range.

15. The method of claim 13, further comprising:

coupling the attenuator to a printed circuit board; and transmitting signals on a set of transmission lines between the printed circuit board and the attenuator.

16. The method of claim 13, wherein the magnet is a permanent magnet.

17. The method of claim 16, wherein the magnet is one of a neodymium magnet and alnico magnet.

18. The method of claim 13, further comprising:

forming a housing of a second material, wherein the second material exhibits a threshold level of thermal conductivity in a cryogenic temperature range.

19. The method of claim 18, further comprising:

forming a support plate of a third material, wherein the third material exhibits a threshold level of thermal conductivity in a cryogenic temperature range, the support plate configured to support the magnet.

20. The method of claim 19, wherein the magnet and the attenuator are disposed on opposite sides of the support plate, wherein a thickness of the support plate between the attenuator and the magnet allows the magnet to produce the magnetic field of at least the critical magnetic field strength at the first material in the attenuator.

* * * * *